(12) United States Patent
Jackson

(10) Patent No.: US 6,502,994 B2
(45) Date of Patent: Jan. 7, 2003

(54) THRUST WASHER

(75) Inventor: Scott C. Jackson, Bellows Falls, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 8 days.

(21) Appl. No.: 09/859,882

(22) Filed: May 17, 2001

(65) Prior Publication Data

US 2001/0033704 A1 Oct. 25, 2001

Related U.S. Application Data

(63) Continuation-in-part of application No. 09/317,824, filed on May 25, 1999, now abandoned.

(51) Int. Cl.[7] ............................................. F16C 17/04
(52) U.S. Cl. ........................................ 384/420; 384/368
(58) Field of Search ................................. 384/123, 368, 384/369, 370, 371, 420, 421, 422, 423, 424, 425, 426, 427, 428

(56) References Cited

U.S. PATENT DOCUMENTS

| 1,700,856 A | 2/1929 | Schein | 384/368 |
|---|---|---|---|
| 2,009,124 A | 7/1935 | Skolfield | 384/426 |
| 2,043,790 A | 6/1936 | Baker | 384/425 |
| 2,600,353 A | 6/1952 | Wightman | 384/420 |
| 3,602,558 A | 8/1971 | Reynolds | 384/420 |
| 4,268,040 A | 5/1981 | Bainard et al. | 277/307 |
| 4,513,674 A | 4/1985 | Bhatia et al. | 112/220 |
| 4,532,054 A | 7/1985 | Johnson | 252/12.4 |
| 4,757,887 A | 7/1988 | Ostrander et al. | 384/420 X |
| 4,776,237 A | 10/1988 | Premiski et al. | 384/420 X |
| 4,799,810 A | 1/1989 | Gilbert | 384/606 |
| 4,926,529 A | 5/1990 | Hosmer et al. | 26/89 |
| 4,966,264 A | 10/1990 | Hayakawa et al. | 384/427 X |
| 5,007,746 A | 4/1991 | Matzelle et al. | 384/420 |
| 5,509,738 A | 4/1996 | Haynes et al. | 384/275 |
| 5,554,015 A | 9/1996 | Dreiman et al. | 384/368 |
| 5,611,628 A | 3/1997 | Brouwer | 384/420 X |
| 5,672,013 A | 9/1997 | Ohira | 384/297 |
| 5,765,950 A | 6/1998 | Eno et al. | 384/425 X |
| 5,796,349 A | 8/1998 | Klein | 384/420 X |
| 5,829,888 A | 11/1998 | Bhargava et al. | 384/420 |

*Primary Examiner*—Thomas R. Hannon
(74) *Attorney, Agent, or Firm*—Stephen E. Feldman, PC

(57) ABSTRACT

A two component thrust washer assembly for a vehicle torque converter has a first component made of a durable polyimide material with an annular wear face and three axially projecting pins. The second component is made of metal and has a mating portion with three openings to receive the pins and an area to engage an adjacent element of a torque converter.

8 Claims, 2 Drawing Sheets

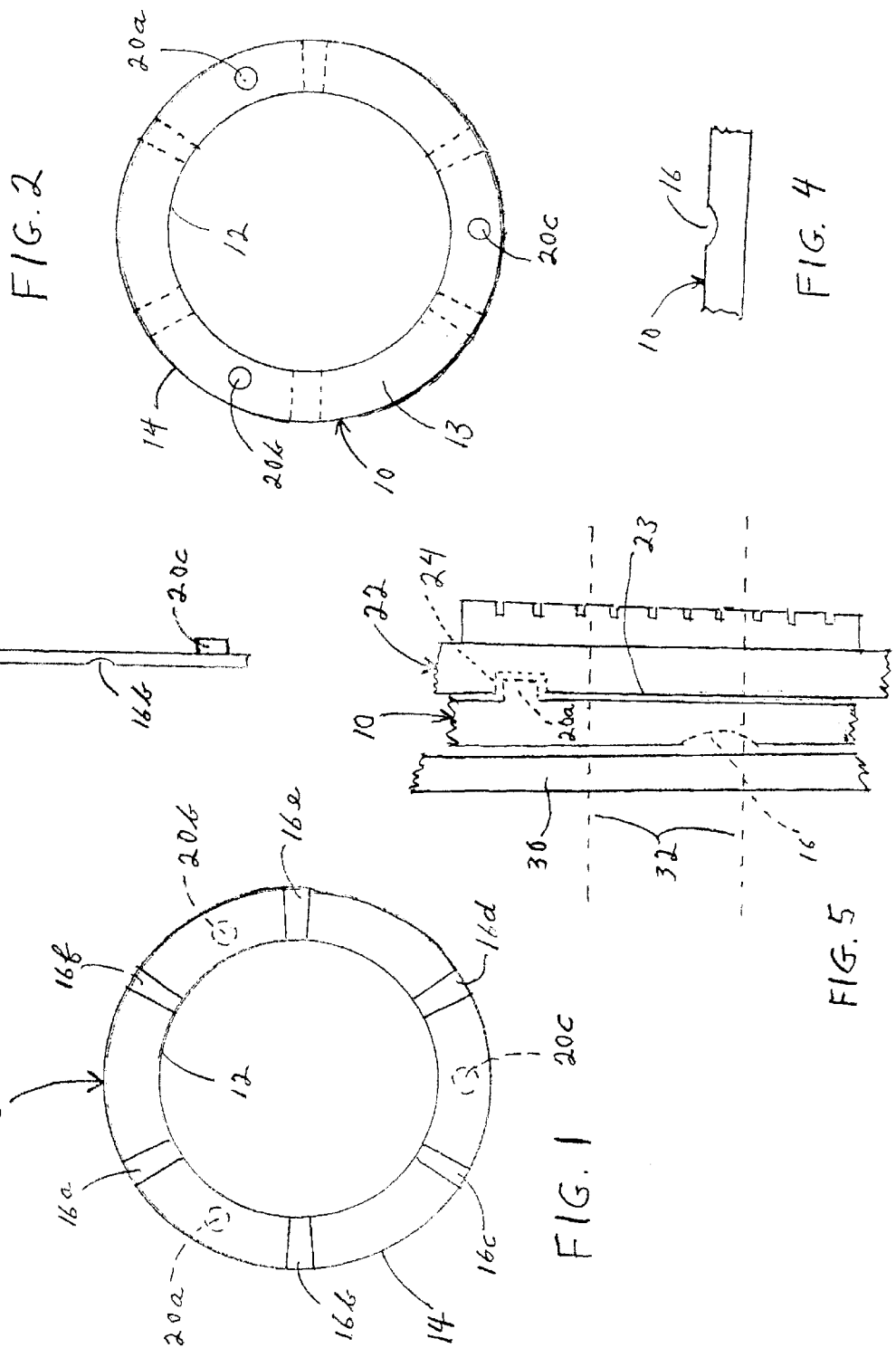

THRUST WASHER

The present invention is a continuation-in-part of application Ser. No. 09/317,824 filed May 25, 1999 now abandoned.

BACKGROUND OF THE INVENTION

1. Field of the Invention

The present invention relates to thrust washers and anti-friction spacing elements for vehicle torque converters. In particular, the present invention relates to a two component thrust washer assembly for use in a transmission system of a motor vehicle. A first component is for the wear face and is made of an expensive and extremely durable polyimide material. A second component for engagement with an adjacent portion of the torque converter, is made of a relatively inexpensive material such as a die cast metal.

2. Prior Art

In automotive transmission systems, particularly torque converters, for example, axially aligned components that come in contact with each other usually sustain high impact loading. Also, because of the high loading between components, relatively high wear between components is not unusual. High impact loading on the components and high friction between components in such mechanisms, is inherent in the mechanism because of the job performed by the mechanism. One way to reduce this problem is to change the mechanism but changing one mechanism in a chain is not always practical, since the links in a chain must be able to "talk" to one another. A more practical solution is to develop or redesign individual components in the various parts of the system which will work together and make the system more efficient. In furtherance of such ends certain components in a drive system, for example, have been improved. The 1981 U.S. Pat. No. 4,268,040 to Bainard et al teaches a combination thrust washer and seal that is fabricated from a composite of several materials, integrated into a dual functioning component. The problem solved by the component taught in this patent is overshadowed by a new problem created by the component. Its combination thrust washer and seal is fabricated with a composite of several materials. Constant high impact on the composite of materials has the effect of separating the materials and when separation of materials occurs, failure of the component occurs.

The 1988 U.S. Pat. No. 4,776,237 to Premiski et al teaches thrust washers used on each side of the planet gears of a planetary gear mechanism. Each thrust washer has oil ports that permit the flow of oil through the thrust washer. However, the oil ports are in the body of the thrust washer and remain a constant size. There is no provision to clean out the oil ports, should a blockage occur. Even the relaxation of the components in the planetary gear mechanism will not function to clear a port in the body of the thrust washer. The 1996 U.S. Pat. No. 5,509,738 to Haynes et al teaches a composite journal and thrust bearing system wherein the thrust face of an element and the journal of the bearing housing are lined with material having self-lubricating properties. The Haynes patent essentially teaches that the thrust face of an-element and the surface of a housing may be veneered with a material with self-lubricating properties. In the case of veneered surfaces of the nature proposal, the veneered material is usually applied to the surface with heat. Heat also separates the veneered material from the surface. This presents a problem because heat is usually generated in housings supporting journal and thrust heating systems.

U.S. Pat. No. 5,829,888 to Bharagava et al discloses a metal thrust washer having a first face with oil grooves and an opposed second face with two outwardly projecting members, one used for locating and the other used for securement of the washer in a torque converter.

SUMMARY OF THE INVENTION

The present invention is a two component improved thrust washer having self-lubricating anti-rotational, anti-friction and positive lubrication characteristics, with high impact load capability. The invention provides a two component improved thrust washer, the first component being fabricated from solid, unitary material such as polyimide resin integrated with solid, carbon and/or graphite lubricant material. Preferably the first component is fabricated from a material marketed by Du Pont under the trade named VESPEL SP-21D. This first component has a wear face with spaced, open oil grooves on one surface thereof, and anti-rotational pins on an opposite surface. The open oil grooves extend radially across the diameter of the body of the thrust washer and define oil channels when the surface of the thrust washer containing the oil groove is in a close surface-to-surface relationship with the surface of an adjacent component in a torque converter mechanism. The oil channels are self cleaning. During relaxation of the components of the torque converter, the oil channels revert to open oil grooves, which are self cleaning. The polyimide resin material from which the first component of the thrust washer is fabricated is a solid material, having integrated therein a solid lubricant material, such as carbon graphite, which renders the material self-lubricating. Thus the first component of the improved thrust washer is self-lubricating. Although the material from which the first component is fabricated is a composition of several materials, it is fabricated from a unitary, solid material, without veneered surfaces. The polyimide resin material from which the first component is fabricated is expensive and difficult to work, but has very desirable high impact loading characteristics which become characteristics of the first component.

The second component is used to positively engage an adjacent element of the torque converter. It has on its first surface a mating portion for mating with the first component, such as a plurality of openings positioned to receive the above mentioned anti-rotational pins projecting from the first component. The second component also has engagement means for connecting with an adjacent portion of the torque converter in which it is used.

BRIEF DESCRIPTION OF THE DRAWINGS

FIG. 1 is a representation of the first component of the invention, in plan view, showing one side thereof;

FIG. 2 is a representation, in plan view, of the component represented in FIG. 1, showing the opposite side thereof;

FIG. 3 is a representation, in side elevation view, of the component represented in FIG. 1;

FIG. 4 is a representation of a portion of the component represented in FIG. 1 showing an end view of an oil groove, in expanded scale;

FIG. 5 is a side elevational view similar to FIG. 3 but with an adjacent torque converter element and an oil groove converted into an oil channel and an anti-rotational pin engaging an opening in a second component;

DETAILED DESCRIPTION OF THE INVENTION

Figure 6:
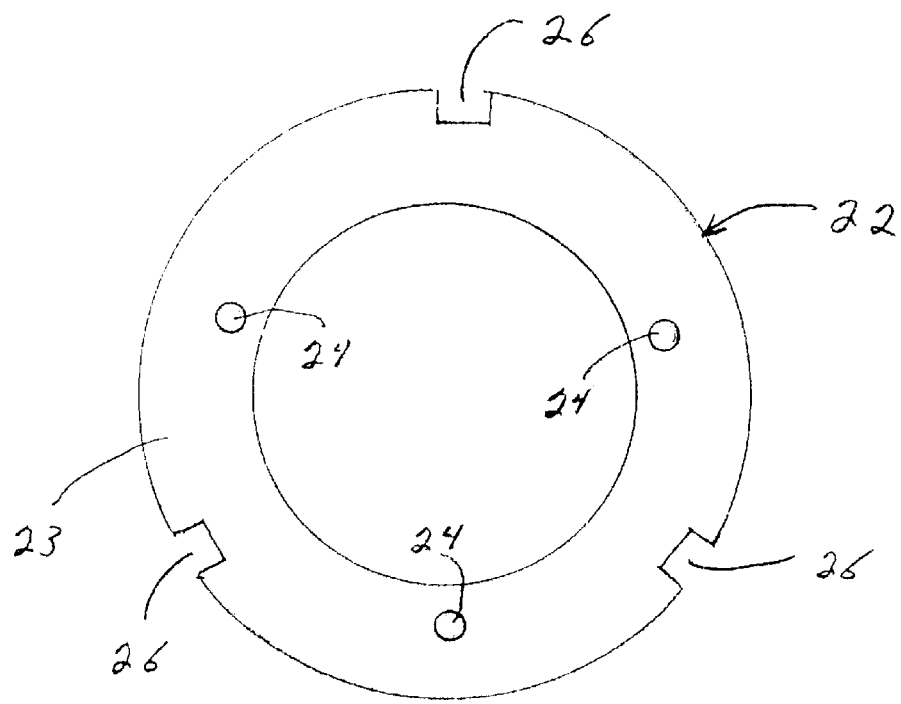
FIG. 6 is a representation, in plan view, of the mating portion of the second component.

Throughout the drawings and the description of the invention, identical parts and components of the invention are identified with identical reference numerals and/or letters. FIGS. 1 and 2 show opposite faces 11 and 13 of first component 10 of the invention. FIG. 1 shows the arcuate positions of the structural elements of a preferred embodiment of the first component. FIGS. 3 and 4 show the details of the structural elements of a preferred embodiment of the first component.

In FIG. 3 the body 10 has a thickness of 0.06+/−0.007 inches. Cylindrical pins 20a and 20c have respective diameters of 0.156 and 0.187 inches and each has a length of 0.125 inches. Pin 20b (not shown in FIG. 3) has the same dimension as pin 20a.

The annular body 10 of the first component of the improved thrust washer assembly is defined by an inner circumference 12 and an outer circumference 14. Six spaced, open oil grooves 16a through 16f are equally circumferentially spaced about the body 10 of the first component, with the radial centers of the oil grooves spaced 60 degrees of arc apart. The oil grooves 16a through 16f are all located on the first face 11 of the body 10. The oil grooves are represented in solid lines in FIG. 1 and in broken lines in FIG. 2. The anti-rotation pins 20a, 20b, and 20c are all located on the second face 13 of the body 10 opposite from the first face 11 on which the oil grooves 16 are located. The anti-rotation pins are represented in broken lines in FIG. 1 and in solid lines in FIG. 2. The anti-rotation pins 20a–c are preferably spaced 120 degrees of arc from each other and preferably spaced equally between the center radial lines of pairs of oil grooves. The open center of the improved thrust washer, used for axial alignment is preferably about 2.160 inches in diameter while its radial width is preferably about 0.59 inches.

The open oil grooves, located on the first face 11 opposite from the second face on which the anti-rotation pins are located, permit the first component 10 to come flush against the face or face-to-face with an adjacent element, such as 30, represented in FIG. 5, and in such juxtaposition relationship, the face of the adjacent element 30 forms a cover for the open oil grooves and closes the oil grooves, forming closed oil channels, such as 16, open at the radial inner and outer ends thereof, which oil channels revert to open oil grooves upon relaxation of the elements of the torque converter. Broken lines 32 represent a portion of a shaft on which the body 10 and adjacent element 30 are mounted. FIG. 5 represents, on an expanded scale, the body 10 and adjacent elements in close, face-to-face relation so as to form the closed oil channel 16.

FIG. 5 also shows second component 22 as will be explained later in detail. The reverting of the closed oil channels to open oil grooves functions to clean the oil channels and therefore the oil grooves and/or oil channels are self cleaning. The depth of the open oil groove 16, as represented in FIG. 4, is preferably of the order of 0.010 inches while the thickness of the body of the thrust washer is preferably of the order of 0.060 inches as represented in FIG. 3.

The anti-rotation pins 20a, 20b, and 20c, are spaced apart 120 degrees in arc. One of the pins is preferably of larger diameter although all are substantially identical in length. It is a function of the anti-rotation pins 20 to engage openings 24 in adjacent second component 22 so that components 10 and 22 rotate together. This is represented in FIG. 5 where the pin 20a is positioned within the opening 24 of second component 22 which is supported on the shaft 32 and adjacent to the second face 13 of the first component body 10. The difference in diameter between the anti-rotation pins, as represented in FIG. 3, is to assure an interference fit of the pin 20a into different size openings or slots of the second component 22.

The first component body 10 is fabricated from a solid material, such as high performance polyimide resin combined with a carbon graphite lubricant, for passive lubrication or self-lubricating characteristics. The passive lubrication characteristics of the material from which first component is fabricated make it and especially first face 11 self-lubricating and thus anti-frictional. The high impact characteristics of the material from which the first component is fabricated render it a high impact component. Preferably the material used to fabricate the first component is a material marketed by DuPont under the trade name VESPEL SP-21D.

Figure 7:
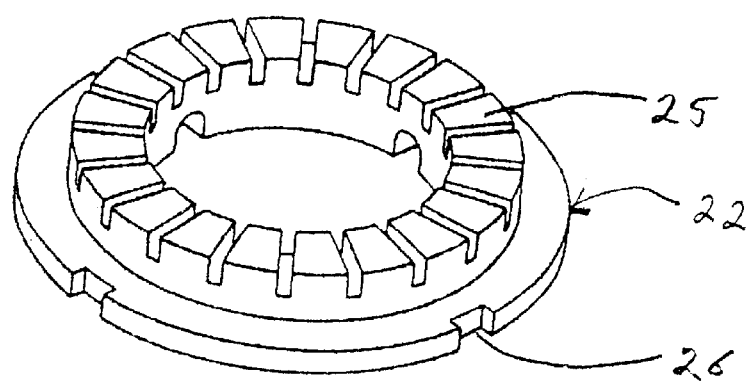
FIG. 7 is a representation, in perspective view, of an engagement portion of the second component.

Turning to the second component 22 as depicted in FIGS. 5–7, it comprises a second annular body 22 having a mating portion 23 with a plurality of openings 24. The number of such opening 24 is at least equal to the number of pins 20a–c (usually three) and, as shown in FIG. 5, one of the pins 20a–c fits into each of the opening 24. As previously stated, one of the pins, e.g. pin 20c in FIG. 3, is of greater diameter than the other pins so as to accomplish an interference fit in an opening 24.

The mating portion 23 is shaped to closely fit against second face 13 of the first component body 10 and when the first and second components are placed together to form the inventive thrust washer assembly, they are intended to remain together due to the interference fit of one of the pins. But they could be forcibly separated if, due to wear it was necessary to replace one component and not the other. This would be an unusual case and it is generally contemplated the polyimide first component 10 will be sold together with a metal second component 22 as a kit.

Second component 22 has an engagement area 25 or 26 on its rear face and/or on its periphery. The peripheral engagement area 26 can be in the form of a plurality of radially inwardly extending notches, three such notches are shown in FIG. 6. Such an engagement area could also be in the form of peripheral radially outwardly extending teeth or, in the case shown in FIG. 7 both axially projecting teeth 25 and peripheral radially inwardly extending notches 26.

A variety of different engagement areas is necessary because various torque converter manufacturers use different elements in their transmission and, as previously stated it would be difficult and expensive to make an entire thrust washer assembly from polyimide material since the setup time is lengthy and the material is expensive. Also a second component 22 made of die cast metal is entirely satisfactory in most torque converters.

In order to enjoy the low maintenance and long wearing advantages of polyimide it is only necessary to use the material on the wear face of the thrust washer assembly. It is not necessary to use large quantities of polyimide to fabricate the entire thrust washer assembly. The first component of the invention acts as a universal polyimide face having a standard number of pins 20a–c projecting from its second face. The pins project from a same-sized circle and have a uniform spacing between them, preferably 120 degrees apart.

The mating area of the second component is then made to fit the configuration of the second face 13 of the first component 10. However, the engagement area 25 and/or 26 of the second component is varied to suit the requirements of a particular torque converter. Because the second component 22 is made from a metal which can be die cast, the cost of such variations can be minimized.

In the foregoing description of the invention, referenced to the drawings, certain terms have been used for conciseness, clarity, and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented, or described.

Having now described a preferred embodiment of the invention, in terms of features, discoveries, and principles, other changes that may become apparent to those skilled in the art may be made, without departing from the scope of the invention defined in the appended claims.

What is claimed is:

1. A thrust washer assembly for a vehicle torque converter comprising a first component and a second component, said first component comprising a first annular body which is fabricated from a solid polyimide resin material integrated with a carbon graphite to have high impact and self lubricating characteristics, said first annular body having a first face for frictional engagement and having a plurality of oil groves in said first face which extend from an-inner circumference to an outer circumference of said first face;

said first annular body further having a second face with a plurality of axially extending pins projecting therefrom;

said second component comprising a second annular body having a mating portion for mating with said first component, said mating portion having a plurality of openings to receive the plurality of pins projecting from said first component, said second component further having an engagement area shaped to interfit with an adjacent portion of a torque converter.

2. The thrust washer assembly of claim 1 in which the engagement area of the second component is a plurality of notches on the outer circumference of said second annular body.

3. The thrust washer assembly of claim 1 in which the engagement area of the second component is a plurality of projections on the outer circumference of said second annular body.

4. The thrust washer assembly of claim 1 in which the engagement area of the second component is a plurality of teeth projecting from a rear portion of said second annular body.

5. The thrust washer assembly of claim 1 in which said second component is an annular body of die cast metal.

6. The thrust washer assembly of claim 1 in which said plurality of axially extending pins on said first component comprises three cylindrical pins equally spaced about a circle on said second face.

7. The thrust washer assembly of claim 6 in which one of said three cylindrical pins is of greater diameter than at least one other of said pins for an interference fit.

8. The thrust washer assembly of claim 6 in which each opening of said plurality of openings is cylindrical and of the same diameter and one of said three pins is of a shape to form an interference fit with said openings.

* * * * *